United States Patent [19]
Maughmer

[11] 3,711,200
[45] Jan. 16, 1973

[54] MULTIPLE-SENSOR LASER VELOCIMETER
[75] Inventor: Robert W. Maughmer, Thousand Oaks, Calif.
[73] Assignee: Litton Systems, Inc., Beverly Hills, Calif.
[22] Filed: Sept. 18, 1970
[21] Appl. No.: 73,305

[52] U.S. Cl. ............................................. 356/28
[51] Int. Cl. ............................................. G01p 3/36
[58] Field of Search .................. 356/28, 29; 343/9

[56] References Cited

UNITED STATES PATENTS

| 3,432,237 | 3/1969 | Flower et al. | 356/28 |
| 2,942,119 | 6/1960 | King et al. | 356/28 |
| 3,525,568 | 8/1970 | Dreyfus | 356/28 |
| 3,532,427 | 10/1970 | Paine | 356/28 |

Primary Examiner—Benjamin A. Borchelt
Assistant Examiner—S. C. Buczinski
Attorney—Alan C. Rose, Alfred B. Levine, Thomas A. Seeman and Harold E. Gillmann

[57] ABSTRACT

A laser velocimeter system for measuring the relative three-dimensional vectorial velocity between a carrier and the surface over which the carrier moves. Light energy reflected from laser illuminated portions of the surface is utilized to compute the velocity of the carrier along each of three orthogonal coordinates. Different portions of the reflected energy are received by three light sensitive detectors after the energy first passes through coplanar optical gratings—a separate grating being associated with each of the light sensitive detectors. The output signals of the detectors are modulated by the effects of the gratings; and these last mentioned signals are processed by frequency tracker units and by a computer to provide signals representative of the relative vectorial velocity.

8 Claims, 8 Drawing Figures

PATENTED JAN 16 1973 3,711,200

INVENTOR.
ROBERT W. MAUGHMER
BY Harold E. Sillman
ATTORNEY.

INVENTOR.
ROBERT W. MAUGHMER
BY Harold E. Sellmann
ATTORNEY

INVENTOR,
ROBERT W. MAUGHMER.
BY Harold E. Dillman
ATTORNEY

MULTIPLE-SENSOR LASER VELOCIMETER

BACKGROUND OF THE INVENTION

This invention relates generally to laser velocimeters and particularly to a multisensor laser velocimeter system for providing an indication of the velocity of a carrier in each of three orthogonal coordinates.

The advantages of the multisensor laser velocimeter in accordance with the principles of the subject invention may be better understood after first examining the operation of a prior art single sensor type velocimeter. In these prior art systems, such as that described in U. S. Pat. No. 3,432,237, a continuous wave laser illuminates a small area on an adjacent surface whose velocity is to be determined relative to the mounting structure of the velocimeter unit. Some fraction of the incident laser energy is reflected or back scattered and, because of the coherence of the incident laser light for stationary conditions, the phase relationship between the light striking any two elements of the surface is preserved in time. All illuminated surface elements thus re-radiate (back scatter) a fraction of the incident energy with time-stationary phase relationships. The intensity at any point in the field of back scattered light is the vector sum of the contribution for each scattering element in the illuminated area. Points where the contributions are generally in phase are bright, while points where they are out of phase are dark. The resulting pattern in space is random because of the random nature of the scatterers in the illuminated area—this resulting pattern being sometimes referred to as a "speckle" pattern.

If the illuminated surface is displaced relative to the laser beam some of the scatterers are lost since they are no longer illuminated, and new ones are gained. This results in the reflected light pattern changing in a continuous manner into new but statistically similar patterns. Also displacement of the laser beam relative to the surface causes a shift in the pattern as a result of the change in the relative phase of the light energy striking the scatterers in the illuminated area. This phase is predictable, and provides the theoretical basis for the basic velocimeters system.

When a light sensitive detector having a grating with regularly spaced opaque and transparent lines inscribed thereon is placed in the path of the reflected laser energy, motion of the pattern relative to the photo detector may be observed as modulation of the output signal of the light sensitive detector. The opaque lines interrupt the light energy, thereby converting a moving spot into a series of pulses and the net effect of a relative motion is the sum of many such pulse trains, since many light spots cross the light sensitive detector receiving aperture simultaneously. For a fixed relative velocity the various pulse trains all have the same frequency whether or not phase correlated. The output signal of the light sensitive detector thus includes a band of frequencies centered about the frequency corresponding to the velocity of a single spot. Hence the relative motion of the pattern with respect to the light sensitive detector results in a modulation of the output signal of the light sensitive detector—with the frequency of this modulation being a function of the velocity between the light sensitive detector and the reflecting surface.

Single sensor velocimeters of the type described above have been used in applications where the velocity to be measured lies in a fixed direction and where the relative geometrical orientation is stable and known. For example, single sensor velocimeters of the above described type are used commercially to measure velocity of materials being processed by rolling mills.

However in applications where the geometrical relationships between the velocimeter unit and the surface whose velocity is to be measured, are not stable and unchanging, certain inherent drawbacks are encountered with a single sensor velocimeter unit. For example in surveying applications it may be desired to employ a laser velocimeter system to determine the velocity of a land vehicle and to use the velocity so determined to update an inertial navigation system. In such applications, the velocimeter must be able to provide accurate velocity measurements in each of three orthogonal coordinates despite static or dynamic displacements of the velocimeter unit from a fixed orientation.

A single-sensor velocimeter cannot provide a measurement of the three orthogonal complements of velocity; and motion in the direction of a line joining the single sensor and the illuminated spot on the surface will not cause the speckles (intensified reflected light portions) in the returned pattern to cut the lines of the grating, hence this motion cannot be sensed. Also any misalignment of the grating relative to the surface of the ground will cause a change in scale factor, and thus a misalignment will occur whenever the vehicle loading is changed or tire pressure is changed. Further even if a plurality of individual single sensor velocimeters could be associated in a system to measure vectorial velocity, such a system would not be cost effective and would encounter problems in obtaining and maintaining the relative alignment between the independent velocimeters.

SUMMARY OF THE INVENTION

Therefore it is an object of the subject invention to provide a multisensor velocimeter for measuring the vectorial velocity between the velocimeter unit and the surface across which it is transported.

It is a further object to provide an improved, cost effective, and accurate velocimeter for measuring the velocity between a carrier upon which the unit is mounted and the surface, in each of three orthogonal coordinates, even in the presence of vibrating motion of the supporting vehicle.

The subject invention provides a multisensor velocimeter for accommodating pitch, roll and slip motion of a carrier on which the velocimeter is mounted and for measuring the vectorial velocity between the velocimeter and a surface with respect to which the carrier is moving. In one preferred embodiment of the subject invention a laser transmitter system provides a pair of angularly displaced beams for illuminating separate portions of the surface. A fraction of this light energy is reflected and received by three functionally separate detector sensor units. Prior to impinging upon the light detectors, the light energy is modulated by a three coplanar optical gratings—there being a functionally separate grating associated with each photo detector. The output signal from each of the light detector units is applied to a frequency tracker which generates an output signal whose frequency is indicative of the modulation impressed on the laser signal by the optical grating, and hence a measure of a component of the relative motion between the velocimeter unit and a surface such as the terrain across which the unit is transported. In this manner each output signal is indicative of the relative velocity sensed by one of the three sensors; and this information in conjunction with the fixed geometrical data, relating the relative positions of the three sensors and the laser beams, is utilized by a computer to determine the velocity of the vehicle along each of three coordinates. The stability of the unit may be enhanced by forming the three gratings on a single sheet of material.

In the just described embodiment a pair of laser beams are utilized to account for the inability to measure velocity in a direction parallel to a line connecting a sensor to a single illuminated spot. However in a second embodiment, the vectorial velocity is measured with a single illuminating beam by separating the sensors to achieve different look angles between the plurality of sensors and the single illuminated spot.

BRIEF DESCRIPTION OF THE DRAWINGS

The novel features which are characteristic of the invention, both as to its organization and method of construction and operation, together with further objects and advantages thereof will be better understood from the following description taken in conjunction with the accompanying drawings in which the illustrative embodiments of the invention are disclosed. It is to be expressly understood, however, that the drawings are for the purpose of illustration and description only and do not define limitations of the invention.

In the drawings.

DESCRIPTION OF THE PREFERRED EMBODIMENTS

As mentioned previously laser velocimeters have been used in the past to measure the relative velocity of an adjacent surface in either one or two dimensional coordinate systems. However in applications, such as terrain surveying, where a velocimeter unit is mounted to a vehicle which travels over more or less rugged terrain, it is necessary that the total velocity vector of the vehicle relative to the terrain be determined. An accurate indication of the velocity vector requires a determination of either the magnitude of the velocity along each of three mutually perpendicular coordinates, or else the magnitude of the velocity vector and two angles relating the position of the vector to a three axes coordinate system.

Figure 1:
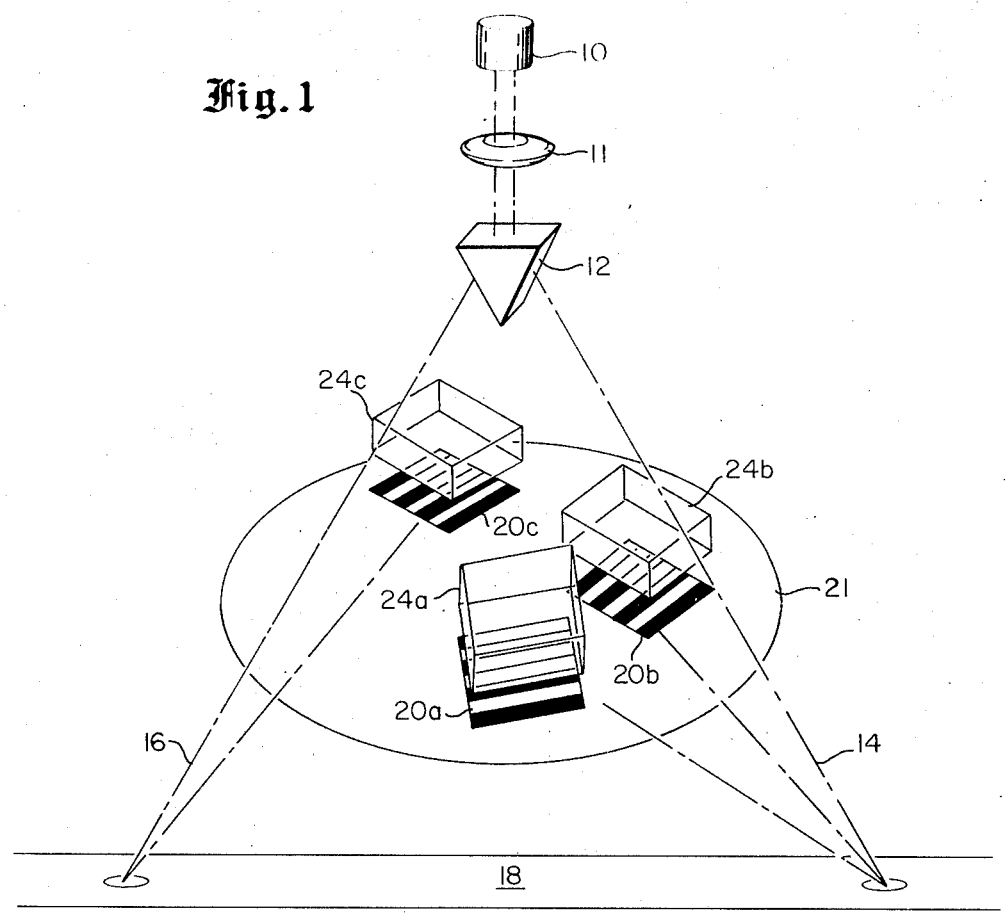
FIG. 1 is a block diagram and front elevational view of the transmitter and a portion of the receiver section, respectively for one embodiment of the invention.
Figure 2:
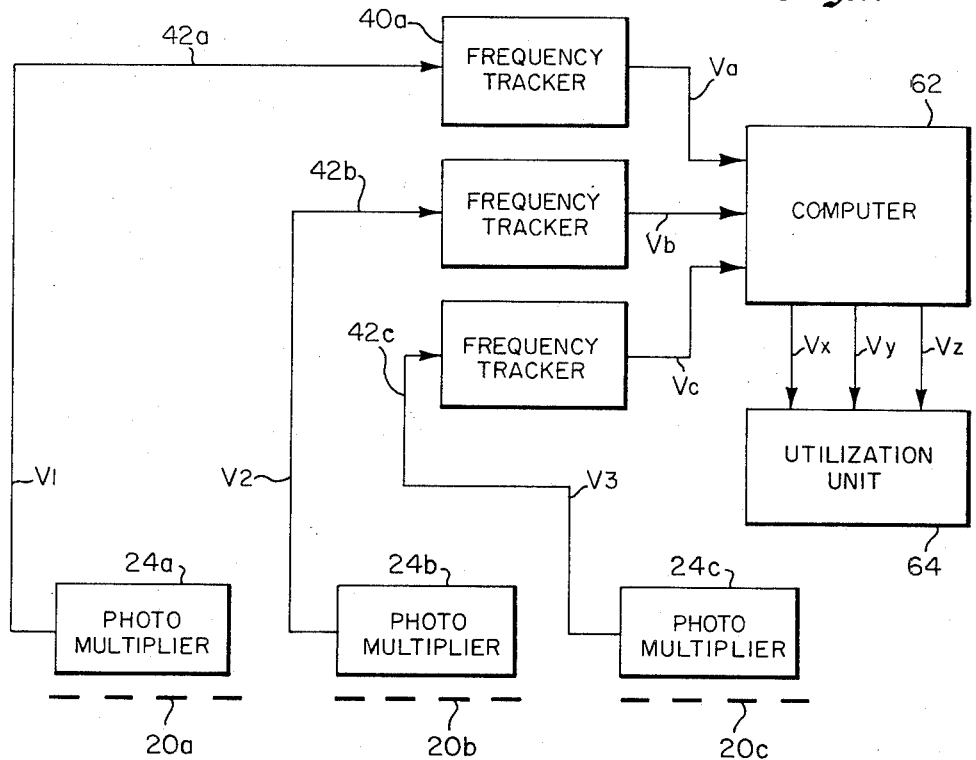
FIG. 2 is a block diagram of the receiver and data processing section of the invention.

In the multisensor velocimeter system shown in block diagram form in FIGS. 1 and 2, a continuous wave (CW) laser transmitter 10 transmits a beam to collimating lens 11. Collimating lens 11 transforms the coherent beam from laser transmitter 10 into a collimated, coherent beam of light.

Use of a collimating lens is optional. Its use, however, does afford the advantage of reducing the sensitivity of the velocimeter to vertical movements of the carrier. The equations set forth below for calculating the velocities assume the use of a collimated beam. If a collimated beam is used, the velocity of the speckle pattern across the grating has a one to one correspondence with the velocity of the carrier with respect to the illuminated surface. A one to one correspondence does not exist if the beam is not collimated.

Figure 6:
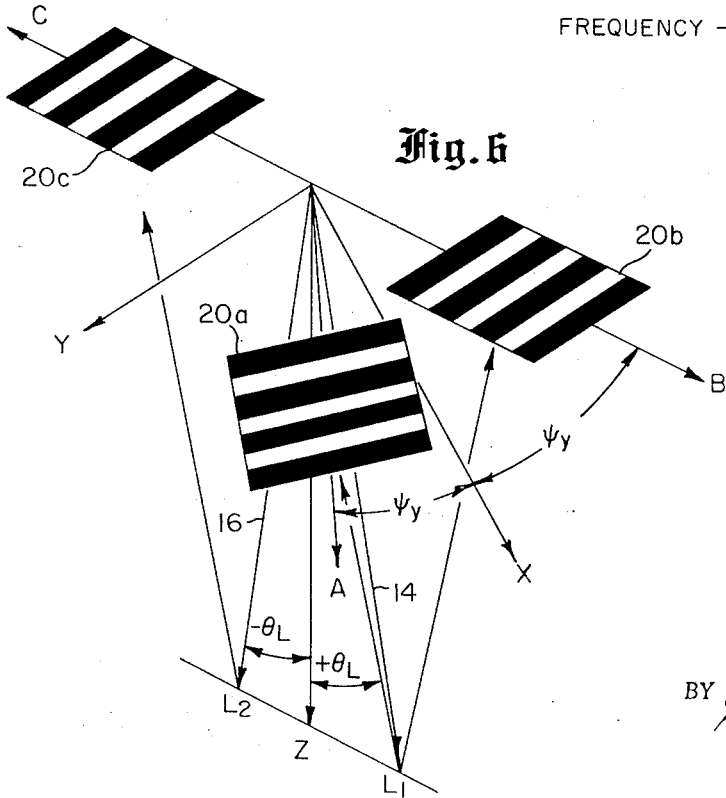
FIG. 6 is a diagram showing the geometrical relationship between the various optical gratings and the transmitted laser beams, for clarifying the derivation of the velocity terms along each of three orthogonal coordinates.

The beam splitter unit 12 produces a pair of light beams at angles $+\theta_L$ and $-\theta_L$ with respect to a reference coordinate, which may be the z coordinate shown in FIG. 6. The light energy from laser beam 14, is reflected from a plurality of discrete scatterers, comprising the portion of the terrain 18 illuminated by the beam, and a fraction of this energy is reflected and passes through a pair of optical gratings 20a and 20b. By the same token a portion of the energy of laser beam 16 is reflected from the plurality of discrete scatterers forming the illuminated section of the terrain 18 and passes through a third optical grating 20c.

The optical gratings 20a, 20b, and 20c are oriented along axes A, B, and C, respectively, as shown in FIG. 6. These gratings comprise elongated bars or segments having alternating transparent and opaque light transmission characteristics, and the gratings are disposed relative to the just mentioned axes so that the axes are normal to the elongated dimension of the bars. Further, it is noted that the grating of 20a, 20b, and 20c are, although not necessarily so, coplanar and hence may be formed on a single element such as element 21, whereby the precise angular orientation between these gratings may be readily maintained. The importance of maintaining a fixed angular relationship between these gratings will become apparent as the description proceeds. Preferably, the gratings are effectively located at the same point as laser transmitter 10 for simplifying the equations for calculating the velocity vectors.

Referring primarily to the block diagram of the receiver section shown in FIG. 2, a portion of the reflected laser light energy from beam 14 passes through optical grating 20a and impinges upon the face of a light sensitive detector, photo multiplier tube 24a. An interference filter may be placed in front of each grating (not shown). A filter acts as a narrow band pass filter, whereby signals in a frequency range centered about the frequency of the laser beam are passed and other signals, which would reduce the efficiency of the receiver section are attenuated. The photo multiplier tube 24a provides an output signal $V_1$ which is a function of the relative intensity of the light energy received by the tube.

Figure 4A:
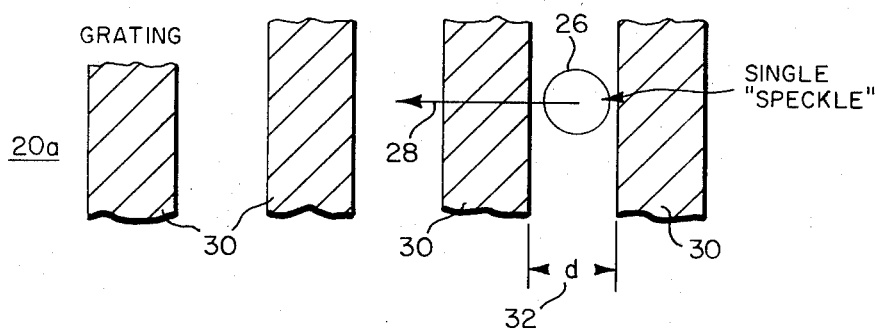
FIG. 4a is an enlarged fragmentary view of a portion of an optical grating used in the system of FIG. 2.
Figure 4B:
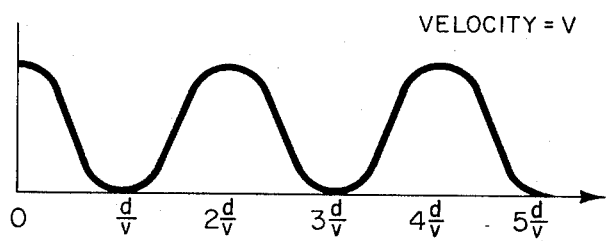
FIG. 4b is a diagram of voltage amplitude versus time for the output signal from a photo multiplier tube of the circuit of FIG. 2.

It may be advantageous at this point to briefly review some of the concepts stated previously relative to the modulation of the reflected light beam by the optical gratings. Although the composite signal received by a light sensitive detector, for example tube 24a, is the result of the summation of reflections from many small discrete scatterers in the illuminated section of the terrain, for purposes of explanation the response of the system may be profitably analyzed with respect to a single scatterer. Therefore in FIG. 4a is shown a single speckle (high intensity light spot) 26 which is moving at a velocity V relative to a portion of the grating 20a in a direction normal to the lines of grating as indicated by the arrow 28. This motion of the light spot 26 may be induced either by a movement of the reflecting surface relative to the support of the velocimeter, or as would be the case for a velocimeter mounted on a vehicle for surveying applications, the movement of the spot 26 could be caused by the motion of the transmitter and the receiver with respect to the terrain. The relative motion between the reflecting scatterer and the velocimeter V, causes the output signal $V_1$ from the photo multiplier 24a to be modulated by the alternating opaque segments 30 and clear segments 32 of the grating 20a. This amplitude variation in the signal, $V_1$, is depicted in FIG. 4b, so that the relationship between the separation of the segments of the optical grating, d; the relative velocity of the light spot normal to the transverse dimension of the grating and the frequency of the signal $V_1$ is depicted. The frequency of the modulated signal is a function of the relative velocity $V_1$ between the light sensitive detector 24a and the illuminated section of the terrain.

As the vehicle supporting the velocimeter unit moves across the surface of the terrain at a constant speed, it may be considered that the reflected energy from each single scatterer is modulated at a constant frequency by the gratings, such as grating 20a. However, it should be understood that the relationship between the phase angles of the different discrete scatterers is random and that the overall speckle pattern is changing as portions of the terrain leave the illuminated sections and new portions of terrain come within the illuminated beam.

Figure 5:
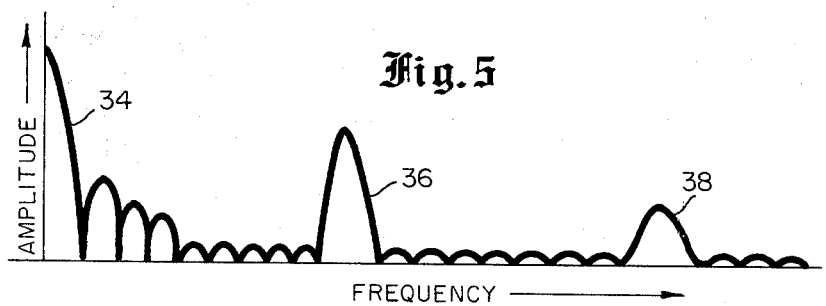
FIG. 5 is a diagram of a portion of the output signal spectrum of one of the photo multiplier tubes of FIG. 2 for illustrating the voltage amplitude versus frequency characteristics of the signal resulting from a plurality of discrete reflecting scatterers.

The resulting spectrum of the signal $V_1$, i.e., the relative power at given frequencies out of the photo multiplier tube 24a, may be considered for purposes of approximation as a series of discrete spectral side lobes such as lobes 34, 36 and 38 of FIG. 5. The frequency separation of these side lobes is a function of the velocity of the vehicle and of the structure of the optical grating. The voltage amplitude of these lobes approximately follows a (sin X)/X relationship. In FIG. 5 it is noted that the first and largest spectral lobe is centered at zero frequency (DC) with the spacing between the centers of adjacent lobes being a function of velocity.

Returning now to the description of the receiver portion of the velocimeter shown in FIG. 2, the output signal $V_1$ is applied to an input circuit of a frequency tracker unit 40a by means of a lead 41a. The frequency tracker unit 40a is mechanized to track the mean frequency of a selected spectral side lobe, for example lobe 36 of FIG. 5. The output signal of the frequency tracker unit 40a is a voltage waveform, designated $V_a$, at a frequency $f_a$ which is indicative of the mean frequency of the spectral side lobe being tracked—and hence indicative of the frequency of modulation of the reflected light beam.

Numerous well known frequency tracker units, such as those utilized in doppler radar processors for example, may be utilized to perform the above described functions of unit 40. In the interest of completeness of disclosure the basic features of one such prior art frequency tracker unit are shown in FIG. 3.

Figure 3:
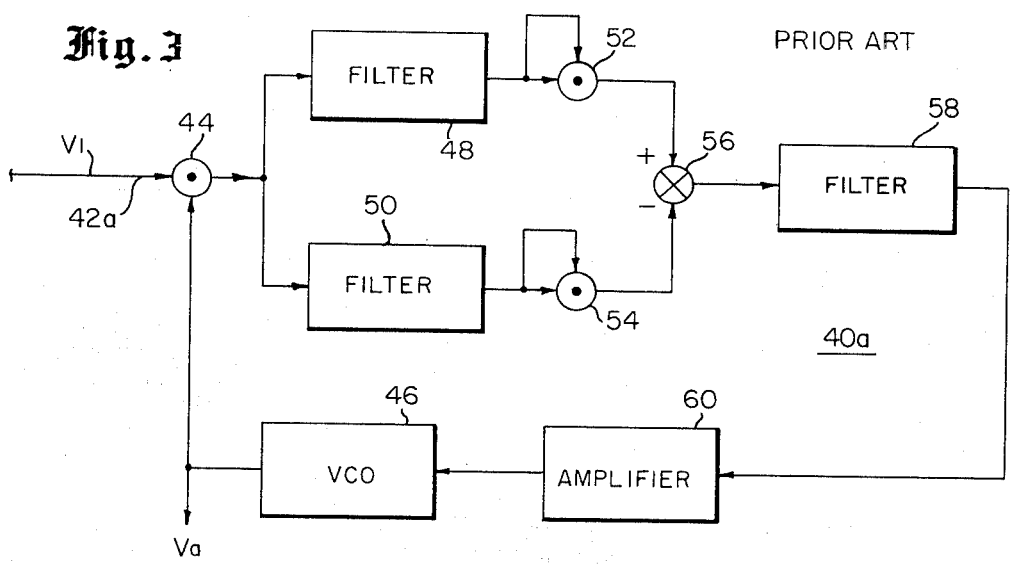
FIG. 3 is a block diagram of a prior art frequency tracker unit which may be utilized in the receiver section of FIG. 2.

Referring momentarily to FIG. 3, the signal $V_1$ is applied on lead 42a to one input circuit of a conventional electronic mixer 44. The other input signal to the mixer 44 is supplied from a voltage controlled oscillator unit 46. The output signal from the mixer 44 is applied in parallel to narrow band pass filters 48 and 50. It is noted that the signal applied to the filters 48 and 50 exhibits the same spectral characteristics as does the waveform $V_1$ shown in FIG. 5, except that it is shifted in frequency due to the processing by mixer 44. In particular the frequency tracker unit 40a is mechanized so that the spectral lobe to be tracked, e.g., lobe 36, is translated in the frequency domain by the mixer 44 so half of the energy of this side lobe will be passed by the filter 48 and the other half of the energy will be passed by the filter 50. The output signal from the filter 48 is mixed with itself in a mixer 52 and thereby down converted to DC or zero frequency. Similarly the output signal from the filter 50 is mixed with itself in the mixer 54. The output signals from the mixers 52 and 54 are subtracted in substraction network 56; filtered by low pass filter unit 58 and then amplified by amplifier 60. The output signal of the amplifier 60 is applied to and controls the frequency of the output signal, $V_a$, from the voltage control oscillator 46.

Briefly to recapitulate the operation of the frequency tracker unit 40a, the spectral lobe to be tracked, such as lobe 36, is positioned in the frequency domain by voltage control oscillator 46 and mixer 44 so that half of the energy in the lobe passes through each of the filters 48 and 50. Any inaccuracy in the spectral positioning of the tracked lobe is sensed by the output signal of the mixer 56; and voltage control oscillator 46 is adjusted to satisfy the above stated positioning criteria.

Referring once again to FIG. 2, a portion of the reflected light energy from laser beam 14 passes through grating 20b and impinges upon the face of photo multiplier tube 24b, in an identical manner to the elements identified by like reference number followed by the letter a. Gratings 20a and 20b receive a portion of the energy from the same laser beam 14 and have an orientation in the xy coordinate system that is different from one another. The output signal $V_2$ from the photo multiplier tube 24b, is applied on a lead 42b to a frequency tracker unit 40b. Unit 40b provides an output signal $V_b$ which is indicative of the mean frequency of a selected spectral lobe of the signal $V_2$.

Similarily, a portion of the light energy from beam 16 passes through grating 20c and impinges upon the face of photo multiplier tube 24c as shown in FIG. 2. The light energy is transmitted through filter 22c and is demodulated by photo multiplier tube 24c. Only grating 20c transmits energy reflected from beam 16. Grating 20c may or may not have the same orientation in the predetermined coordinate system as either grating 20a and 20b. In the embodiment shown in FIG. 1 and FIG. 6 grating 20c has the same orientation as grating 20b, but this is not necessary.

The signals $V_a$, $V_b$ and $V_c$ are applied to the input circuits of a computer 62 and in response to these signals and fixed data, described hereinafter, programmed into the computer, it computes the velocity of the velocimeter unit relative to the terrain along each of three orthogonal coordinates. The computer 62 is not described in detail as any of a wide variety of conventionally known computing devices may be readily programmed to perform the computations described herein-after.

The velocity output signals $V_x$, $V_y$ and $V_z$, provided by the computer 62, are applied to a utilization device—indicated in block diagram form and designated by numeral 64 in FIG. 2. This last mentioned device may be any instrument or system which requires or utilizes the above described velocity information. For example in the surveying application mentioned previously, the output signals from the computer 62 may be applied to an inertial navigation system to check and/or update the velocity data of the inertial navigation system.

The explanation of the computations performed by computer 62 in translating the input signals $V_a$, $V_b$ and $V_c$ to the output velocity terms $V_x$, $V_y$ and $V_z$ is aided by reference to FIG. 6. In FIG. 6 the geometrical relationship between the three optical gratings, the coordinate system along which the velocity output terms are desired, and the laser illuminating beams depicted.

Referring now primarily to FIG. 6, the coordinate system defined by the $x$, $y$ and $z$ axes is a triad with the $xy$ plane being nominally in the horizontal plane of the vehicle to which the velocimeter is mounted. The $x$ axis may be oriented towards the front of the vehicle along the primary direction of motion. The coordinates A, B and C define the orientation of the optical gratings. All of the gratings lie in the $xy$ plane and are related to the $x$ axis by the angle $\psi_y$. The line segments $L_1$ and $L_2$ depict the center of the laser beams 14 and 16 (FIG. 1), respectively. These just referenced line segments each form an angle $\theta_L$ with the $z$ axis—said angle lying in the $xz$ plane.

Each receiver section senses only the component of velocity orthogonal to the line of sight of the reflected energy. Gratings 20a and 20b sense the return from laser beam 14 transmitted along the center line $L_1$; and grating 20c, sense the reflected energy from laser beam 16 transmitted along the center line $L_2$.

The following equations summarize the derivation of the transformation from the signals $V_a$, $V_b$, and $V_c$ to the output signals $V_x$, $V_y$ and $V_z$ from the computer 62.

The velocity components orthogonal to the center line $L_1$ are referenced to a triad obtained by rotating the $x\,y\,z$ triad through $+\theta_L$ about the $y$ axis and are given by the equations:

$\overline{V_{x_1}}' = V_x\cos\theta_L - V_z\sin\theta_L$ $\overline{V_{y_1}}' = V\cos\theta_L \sin\psi_y = V_y$ where
$V_x$, $V_y$, $V_z$ are indicative of the vehicle velocities referenced to the $x\,y\,z$ triad.

The velocity components represented by $V_a$ and $V_b$ may be expressed as:

$V_a = \dfrac{V_x'}{\cos\theta_L}\cos\Psi_y + V_y'\sin\Psi_y$ $= (V_x\cos\theta_L - V_z\sin\theta_L)\dfrac{\cos\Psi_y}{\cos\theta_L} + V_y\sin\Psi_y$ $V_b = \dfrac{V_x'\cos\Psi_y}{\cos\theta_L} - V_y'\sin\Psi_y$ $= (V_x\cos\theta_L - V_z\sin\theta_L)\dfrac{\cos\Psi_y}{\cos\theta_L} - V_y\sin\Psi_y$ or $V_a = V_x\cos\psi_y + V_y\sin\psi_y - V_z\tan\theta_L\cos\psi_y$
$V_b = V_x\cos\psi_y - V_y\sin\psi_y - V_z\tan\theta_L\cos\psi_y$ The velocity components orthogonal to beam $L_2$ referenced to a triad obtained by rotating the $x\,y\,z$ triad through $-\theta_L$ about the y-axis are:

$\overline{V_{x_2}}' = V_x\cos\theta_L + V_z\sin\theta_L$
$V_{y_2}' = V_y$

The velocity relative to the sensor on the C axis is:
$V_c = \overline{V_{x_2}}'(\cos\psi_y/\cos\theta_L)V_{y_2}'\sin\psi_y$ or $V_c = V_x\cos\psi_y - V_y\sin\psi_y + V_z\tan\theta_L\cos\psi_y$ Summary of the above equations result in:
$V_a = V_x\cos\psi_y + V_y\sin\psi_y - V_z\tan\theta_L\cos\psi_y$
$V_b = V_x\cos\psi_y - V_y\sin\psi_y - V_z\tan\theta_L\cos\psi_y$
$V_c = V_x\cos\psi_y - V_y\sin\psi_y + V_z\tan\theta_L\cos\psi_y$; and vehicle referenced velocities may be expressed as:
$V_x = (V_a + V_c)/2\cos\psi_y$
$V_y = (V_a - V_b)/2\sin\psi_y$
$V_z = (V_c - V_b)/2\tan\theta_L\cos\psi_y$ In the embodiment of FIGS. 1 and 2 a pair of laser illuminating beams 14 and 16 are utilized to provide a measure of velocity along each of three orthogonal coordinates. Although this just referenced embodiment promises reliable performance with a compact transmitter-receiver arrangement, the embodiment shown in FIG. 7 provides a reduction in the complexity of the transmitter section.

Figure 7:
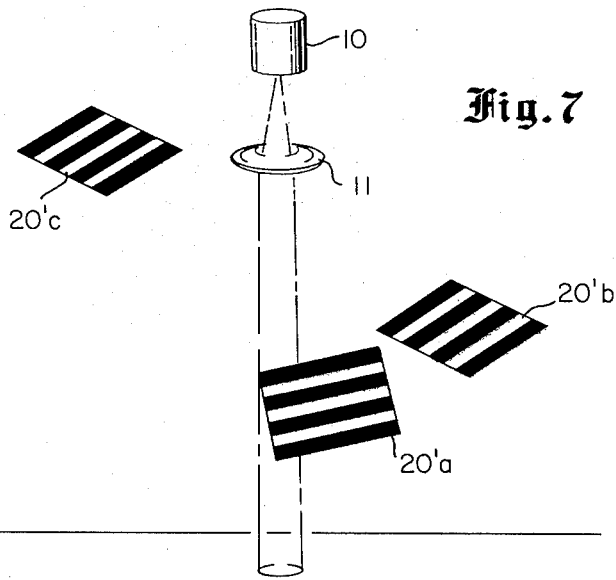
FIG. 7 is a block and front elevational view of a transmitter and a portion of the optical receiving section, respectively, of a multisensor velocimeter in accordance with a second embodiment of the subject invention.

Referring now to FIG. 7, the optical gratings which functionally correspond to the gratings shown in the embodiment of FIG. 1 are designated by like reference numerals with the addition of the prime prefix. In FIG. 7 the laser transmitter 10' is positioned parallel to the $z$ axis of the coordinate system shown in FIG. 6, and no beam splitter unit is required. The single illuminated spot on the surface of the terrain reflects energy which is received by the three gratings 20a', 20b', and 20c'. In an embodiment of FIG. 7 the velocity may be measured along each of the three mutually perpendicular coordinates due to the separation between the pair of gratings 20a', 20b' and the grating 20c'. This separation between the aft section and the forward section of the gratings provides the three statistically independent data samples (different receiver look angles) required to solve the equations presented above. Each grating 20a', b', c' has a different orientation in the $x, y, z$ coordinate system with respect to the other two gratings.

In the embodiment shown in FIG. 7, the reflected light energy is processed by photo multiplier tubes, frequency trackers, and a computing unit similar to the units 24, 40 and 62 described previously relative to FIG. 2. Further it is noted that for the embodiment of FIG. 7 the output signals from the frequency tracker units may be processed by the computer 62 in a similar manner to that described previously.

Thus there has been described novel and unique multiple sensor velocimeter devices for measuring the velocity between the unit and the adjacent terrain in each of the three orthogonal coordinates even in the presence of motion and vibration of the vehicle supporting the unit. It is understood that the above described arrangements are illustrative of the application of the principles of the invention and numerous other arrangements may be devised by those skilled in the art without departing from the spirit and scope of the invention.

What is claimed is:

1. An apparatus for measuring the relative three-dimensional vectorial velocity in a coordinate system between a moving object mounted thereto and an adjacent surface, said apparatus comprising:
    illuminating means developing a plurality of coherent beams of light for illuminating separate portions of said surface with light energy;
    means for receiving light energy reflected from said surface at three different angles of reflection, said last-mentioned receiving means having three functionally separate signal processing channels;
    three optical gratings disposed between said surface and said receiving means with each functionally separate grating modulating the reflected light energy processed by a corresponding one of said separate channels, a first one of said optical gratings effectively located at a different point in the coordinate system from said second and third ones of said optical gratings, said second and third gratings having a different orientation with respect to one another in the coordinate system; and
    means coupled to said receiving means for deriving signals representative of the three-dimensional vectorial velocity between said moving object and said surface.

2. The device as claimed in claim 1 wherein said three optical gratings are coplanar.

3. The device as claimed in claim 2 wherein said optical gratings are formed in a single sheet of material.

4. The device as claimed in claim 1 wherein said illuminating means includes a laser transmitter for generating a beam of light, a beam splitter unit for dividing said beam of light into said plurality of light beams.

5. The device as claimed in claim 1 wherein said receiving means includes a light detector device for converting light intensity into a voltage signal representative thereof, and a frequency tracker unit for providing a signal representative of the relative velocity.

6. An apparatus for measuring the relative three-dimensional vectorial velocity in a predetermined coordinate system between a moving object mounted thereto and an adjacent surface, said apparatus comprising:
    illuminating means developing a pair of coherent beams of light for illuminating two separate portions of said surface with light energy;
    three separate means for receiving light energy reflected from three different angles of reflection, each said receiving means having a corresponding separate signal processing channel;
    three optical gratings disposed between said surface and said three receiving means with each functionally separate grating modulating the reflected light energy processed by a corresponding one of said separate channels, a first one of said optical gratings effectively located at a different point in said predetermined coordinate system from second and third ones of said gratings, said second and third gratings having a different orientation with respect to one another in said predetermined coordinate system; and
    means coupled to said three receiving means for deriving signals representative of the vectorial velocity in the predetermined coordinate system between said moving object and said surface.

7. An apparatus for measuring the relative three-dimensional vectorial velocity in a predetermined coordinate system between a moving object mounted thereto and an adjacent surface, said apparatus comprising:
    illuminating means projecting a pair of coherent beams of light for illuminating two separate portions of said surface with light energy;
    three separate means for receiving energy reflected from at least two different angles of reflection, first and second ones of said three receiving means aligned to receive energy radiated in a first one of said pair of coherent beams, a third one of said receiving means aligned to receive energy radiated in a second one of said pair of coherent beams, each said receiving means having a corresponding separate signal processing channel;
    three optical gratings disposed between said surface and said three receiving means with each functionally separate grating modulating the reflected light energy processed by a corresponding one of said separate channels, at least two of said three optical gratings having a different orientation with respect to each other in said predetermined coordinate system; and
    means coupled to said three receiving means for deriving signals representative of vectorial velocity in the predetermined coordinate system between said moving object and said surface.

8. The device as claimed in claim 7 wherein the optical grating modulating light received by said first receiving means has a different orientation in the predetermined coordinate system from said second receiving means.

* * * * *